(12) United States Patent
Maier-Landgrebe

(10) Patent No.: US 6,182,003 B1
(45) Date of Patent: Jan. 30, 2001

(54) PROCESS AND DEVICE FOR SETTING A DRIVING TORQUE

(75) Inventor: Rolf Maier-Landgrebe, Kernen (DE)

(73) Assignee: Robert Bosch GmbH, Stuttgart (DE)

( * ) Notice: Under 35 U.S.C. 154(b), the term of this patent shall be extended for 0 days.

(21) Appl. No.: 08/983,606
(22) PCT Filed: Apr. 28, 1997
(86) PCT No.: PCT/DE97/00865
 § 371 Date: Aug. 6, 1998
 § 102(e) Date: Aug. 6, 1998
(87) PCT Pub. No.: WO97/40998
 PCT Pub. Date: Nov. 6, 1997

(30) Foreign Application Priority Data

Apr. 29, 1996 (DE) ............................................. 196 16 887
Aug. 16, 1996 (DE) ............................................. 196 32 939

(51) Int. Cl.[7] .................................................. B60K 28/16
(52) U.S. Cl. .............................. 701/84; 701/83; 701/85; 701/86; 180/197
(58) Field of Search ............................... 701/82, 83, 84, 701/85, 86, 90; 180/197

(56) References Cited

U.S. PATENT DOCUMENTS

| 4,866,623 | * | 9/1989 | Ise et al. ................................ 701/85 |
| 4,971,164 | * | 11/1990 | Fujita et al. ........................... 701/86 |
| 5,320,422 | * | 6/1994 | Tsuyama et al. ....................... 701/84 |
| 5,445,442 | | 8/1995 | Barth et al. ........................... 303/141 |
| 5,455,770 | * | 10/1995 | Hadeler et al. ....................... 180/197 |
| 5,630,480 | * | 5/1997 | Nishikata ............................... 701/86 |
| 5,682,316 | * | 10/1997 | Hrovat et al. .......................... 701/86 |
| 5,737,714 | * | 4/1998 | Matsuno et al. ....................... 701/84 |
| 5,971,089 | * | 10/1999 | Sawada ................................. 701/84 |

FOREIGN PATENT DOCUMENTS 40 30 881 5/1992 (DE).
195 42 294 5/1997 (DE).

OTHER PUBLICATIONS

Vo Anton van Zanten et al., "FDR–Fahrdynamik regelung von Bosch", ATZ Automobiltechnische Zeitschrift, 96 (1994), pp. 674–689.

* cited by examiner

Primary Examiner—Gary Chin
(74) Attorney, Agent, or Firm—Kenyon & Kenyon

(57) ABSTRACT

A method and device setting a driving torque in a motor vehicle, in particular setting the torque as a part of an anti-slip regulation. At least two triggerable actuators are available for influencing the driving torque, where the actuators have different dynamic responses with regard to the setting of a driving torque. The core of the invention consists of the fact that first a component of the driving torque to be set is determined, and this component thus determined is used for triggering the actuator with the lower dynamics. In addition, the change in the driving torque produced by this triggering of the actuator with the lower dynamics is estimated. The difference between the driving torque to be set and the estimated driving torque is then used for triggering at least one actuator with higher dynamics.

11 Claims, 5 Drawing Sheets

PROCESS AND DEVICE FOR SETTING A DRIVING TORQUE

FIELD OF THE INVENTION

The present invention relates to a method of and a device for setting a driving torque.

BACKGROUND INFORMATION

German Patent Application No. 42 39 711 describes a system for setting an engine torque, where a desired engine torque which is selected by the driver and by an anti-slip regulation system is achieved by varying the air supply, the firing point and/or the quantity of fuel injected.

German Patent Application No. 40 30 881 (corresponding to U.S. Pat. No. 5,445,442) describes an anti-slip regulation system where the anti-slip regulatorler is divided into a cardan speed controller and a differential speed controller.

German Patent Application No. 42 29 560 (corresponding to U.S. Pat. No. 5,443,307) describes an anti-slip regulation system where the controller properties are improved by means of a differential speed controller so that the differential blocking effect is improved by the operation affecting the brakes.

German Patent Application No. 19542294.5 and the article "FDR-Fahrdynamikregelung von Bosch" (FDR Regulation of Driving dynamics by Bosch) in ATZ Automobiltechnische Zeitschrift, (Automotive Engineering Journal) 96 (1994) describe a subordinate anti-slip regulationler as part of regulation of driving dynamics, where a distinction is made between a cardan torque acting on all driven wheels and a differential torque acting between the driving wheels to set the driving torque. To set the driving torque as part of anti-slip regulation, the desired cardan torque and the differential torque are distributed to the available actuators to set the driving torque. Operations affecting the wheel brakes and/or operations involving the control of the vehicle engine are available for this. These effects to differ in their different dynamic responses.

The object of the present invention is to achieve an optimum distribution of the driving torque requirement to the available torque operation options.

SUMMARY OF THE INVENTION

The invention relates to a method of setting a driving torque in a motor vehicle, particular to setting the torque as part of anti-slip regulation. At least two triggerable actuators are available for influencing the driving torque, with the actuators having different dynamic responses with regard to setting a driving torque.

The invention provides first a component of the driving torque to be set is determined, and the component thus determined is used to trigger the actuator with the lower dynamics. In addition, the change in driving torque due to this triggering of the actuator with the lower dynamics is estimated. The difference between the driving torque to be set and the estimated driving torque is then used to trigger at least one actuator with higher dynamics.

This method yields an optimum distribution of the driving torque requirement, which takes into account the different dynamics of the actuators, to the available torque operation options. In particular, the method according to the present invention provides that only a portion of the total driving torque requirement, specifically the steady-state component, is used to control the slow-acting torque operation option. The faster-acting operations are then selected pursuant to the remaining component and pursuant to the torque which cannot be achieved instantaneously through the slow-acting torque operation option.

If the setting of the driving torque according to the present invention is a driving torque reduction to be set as part of anti-slip regulation (ASR), then as invention yields a uniform ASR interface for various engine control units.

Another embodiment of the present invention provides that an integral component of the driving torque that is to be set is determined as the component of the driving torque to be set. Thus, only the torque request pending for a longer time is implemented by the slow-acting operation, while the short-term requirements are implemented only by the faster-acting operations.

If the motor vehicle has a gasoline engine, it is possible to provide according to the present invention for the actuator with the lower dynamics to vary the air supply, in particular the throttle valve setting, while the actuators of higher dynamics vary the firing point, the fuel supply, and/or the braking force on the driven wheels.

The estimate according to the present invention of the change in driving torque brought about by the triggering of the actuator with the lower dynamics can be accomplished using an engine model. If the triggering of the actuator with the lower dynamics takes place using an actuating signal, this estimate is made by filtering the actuating signal using a time filter ($PT_1$ element) and/or a lag element ($T_t$ element).

It is further advantageous that the component for triggering the actuator with the lower dynamics is determined in such a way that only positive driving torques are set. This means that a dragging operation or braking action of the vehicle engine is not allowed.

In addition, an further embodiment of the present invention provides that the component for triggering the actuator with the lower dynamics is determined in such a way that the driving torque is limited to a minimum positive value when there is a low longitudinal velocity of the vehicle and/or when there are different coefficients of friction of a certain value on the two sides of the vehicle ($\mu_{split}$ condition). In particular, when starting under a split condition (different coefficients of friction on the driving wheels), the engine torque achieved by varying the air supply should be limited to a value much greater than zero. This yields faster traction after reducing the drive slip, e.g., by changing the coefficient of friction.

Another advantageous embodiment of the present invention provides that the actuator of the higher dynamics varies the quantity of fuel, with this change taking place in particular by reducing the amount of fuel metered to individual cylinders of the engine of the vehicle. The triggering of this actuator over a predeterminable period of time is predicted, whereupon the triggering is then suppressed when the predicted triggering is below a threshold value. This embodiment provides that reduction of the fuel injection generally acts on the driving torque only with a rather great delay. For this reason, the triggering is predicted over this lag time and it causes a reduction in fuel injection only when the prediction still indicates a desired fuel reduction at the time when the fuel reduction starts having the effect of reducing the driving torque.

In addition, it is possible to provide that in the case of a change in the amount of fuel, in particular due to the reduction in fuel metered to individual cylinders of the vehicle engine, this change is reduced or suppressed when the drive slip of the driving wheel (high wheel) having the higher coefficient of friction is below a threshold value. This is done for reasons of comfort, because the high wheel which is preferably responsible for the forward motion of the vehicle due to the low drive slip should not be braked abruptly. This would lead to jerking motion which would diminish comfort.

The object of the present invention is also to provide a device for carrying out the method described above for setting a driving torque in a motor vehicle.

DETAILED DESCRIPTION OF THE DRAWINGS

The method and device according to the present invention provide that the torque distribution to the actuators is.

This overall system regulates the drive slip in motor vehicles. The setpoint values for the drive slip for the two driving wheels can originate from an upstream controller, and/or a higher-level driving dynamics regulator. Then setpoint braking torques for the two driving wheels and the setpoint engine torque are calculated in the overall system. The setpoint braking torques can be converted in a downstream controller to brake pressure control signals for a brake hydraulic system. A throttle valve control signal can be determined from the setpoint engine torque by, e.g., a downstream controller.

The division of the drive slip regulator into a cardan speed controller and a differential speed controller is described in German Patent Application No. 40 30 881. In the present invention the two controllers are designed substantially independently of the available actuators. The two controller quantities, the setpoint cardan torque $M_{Kar}$ and the setpoint differential torque $M_{Dif}$, are distributed in the downstream actuator-specific module. This facilitates the supplementing of the operations affecting the throttle valve by additional (fast) types of operation affecting the engine, such as firing angle adjustment or injection reduction.

Figure 1:
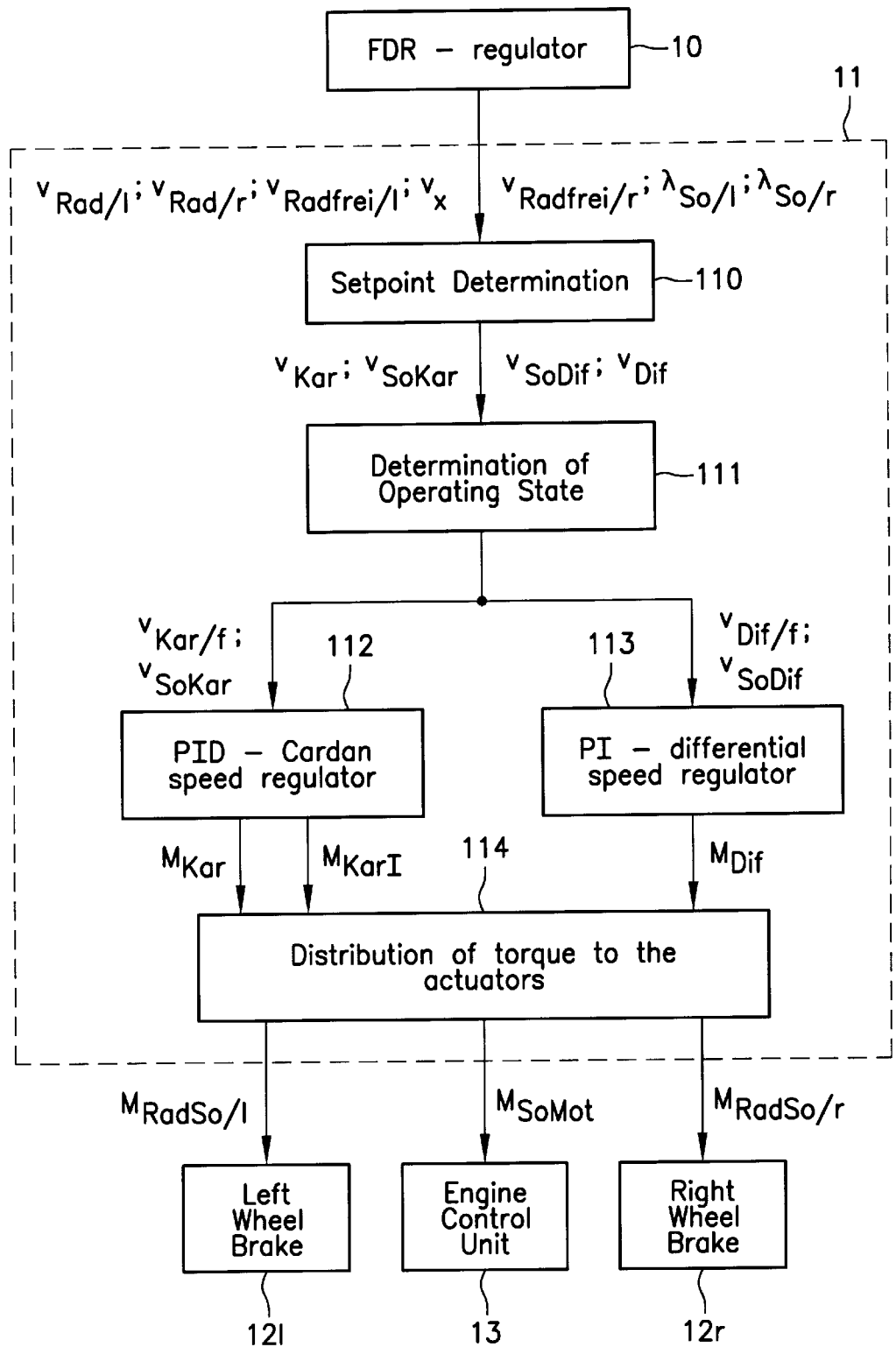
FIG. 1 shows a schematic diagram of the system according to the present invention.

FIG. 1 shows a higher-level driving dynamics regulator (FDR regulator) 10. According to a higher-level control, this FDR regulator determines in particular the setpoints $\lambda_{So/l}$ and $\lambda_{So/r}$ for the drive slip on the left and right driven wheels of the vehicle, respectively. The above-mentioned ATZ article describes such a higher-level FDR regulator.

In addition to setpoints $\lambda_{So/l}$ and $\lambda_{So/r}$ for the drive slip on the left and right driven wheels of the vehicle, respectively, the FDR regulator determines the freely rolling (slip-free) wheel speeds $v_{RADfrei/l}$ and $v_{Radfrei/r}$ and the rotational speeds $v_{Rad/l}$ and $v_{Rad/r}$ of the driven wheels. The freely rolling (slip-free) wheel speeds, determined is described in the ATZ article and and in German Patent Application No. 42 30 295.

Setpoints $\lambda_{So/l}$ and $\lambda_{So/r}$ for the drive slip on the left and right driven wheels of the vehicle, the freely rolling (slip-free) wheel speeds $v_{Radfrei/l}$ and $v_{Radfrei/r}$ and the rotational speeds $v_{Rad/l}$ and $v_{Rad/r}$ of the driven wheels are sent to anti-slip regulator 11. Anti-slip regulator 11 then generates, in a manner to be described later, signals $M_{Radso/l}$ and $M_{RadSo/r}$ which correspond to setpoint braking torques on the left and right driven wheels of the vehicle, respectively. These setpoint braking torques are sent to blocks 12l and 12r using which these braking torques are set on the wheel brakes, optionally using a subordinate control circuit. In addition, regulator 11 determines a setpoint $M_{SoMot}$ for the engine torque which is sent to subordinate engine control unit 13.

Details of anti-slip regulator 11 are described below.

Setpoint determination 110

In setpoint determination 110, the rotational speeds of the left and right driving wheels $v_{Rad/l}$ and $v_{Rad/r}$, the free rotational speeds of the wheels $v_{Radfrei/l}$ and $v_{Radfrei/r}$ and the setpoint drive slip $\lambda_{So/l}$ and $\lambda_{So/r}$ for the driving wheels are used to calculate the cardan speed $v_{Kar}$ as the average of the rotational speeds of the wheels $v_{Rad/l}$ and $v_{Rad/r}$ and the differential speed $v_{Dif}$ as the difference between the rotational speeds of the wheels $v_{Rad/d}$ and $v_{Rad/r}$ as follows:

Actual rotational speeds $$v_{Kar} = (v_{Rad/l} + v_{Rad/r})/2$$

$$v_{Dif} = v_{Rad/l} - v_{Rad/r}$$

The setpoints $v_{SoKar}$ and $v_{SoDif}$ for the cardan speed and the differential speed can be determined from the setpoint speeds $v_{SoRad/l}$ and $v_{SoRad/r}$ of the wheels, which are formed independently of the setpoint drive slip $\lambda_{So/l}$ and $\lambda_{So/r}$:

$$v_{SoRad/l} = v_{Radfrei/l} * (1 + \lambda_{So/l})$$

$$v_{SoRad/r} = v_{Radfrei/r} * * (1 + \lambda_{So/r})$$

$$v_{SoKar} = (v_{SoRad/l} + v_{SoRad/r})/2$$

$$v_{SoDif} = v_{SoRad/l} - v_{SoRad/r}$$

Determination of operating state 111

Operating states are determined in block 111, whereupon predetermined measures are initiated in response to certain operating states. As described in German Patent Application No. 19542294.5, such measures may concern changes in the low-pass response of the regulator when the prevailing operating states are such in which there are or can be oscillations of the power train. This occurs because torsional elasticity in the power train of the vehicle can cause oscillation of the power train. To prevent such oscillations of the power train, the cardan speed $v_{Kar}$ and the differential speed $v_{Dif}$ are sent through a low-pass filter in block 111, with the time constant τ of this low-pass filter being variable as a function of the instantaneous operating state. The cardan speed $v_{Kar/f}$ and the differential speed $v_{Dif/f}$ thus filtered are sent to cardan speed regulator 112 and differential speed regulator 113.

In addition, the setpoint engine torque may be limited in block 111. It is important here that no engine torque higher than the engine torque $M_{FV}$ set by the driver should be possible with a desired increase in engine torque $M_{SoMot}$. The driver's request $M_{FV}$ thus serves to restrict the setpoint engine torque. If the setpoint engine torque is in this saturation, the lanschlag (left limit stop) flag is set. The engine torque saturation $M_{FV}$ is then determined as a function of the estimated prevailing engine torque, where lanschlag is set when $$M_{SoMot} > c\_motstat * M_{FV}$$

where $$0 < c\_motsat < 1.$$

PID cardan speed regulator 112

The cardan speed regulator (block 112) determines the cardan torque $M_{Kar}$ from the input variables, cardan speed $v_{Kar}$ (or the low-pass-filtered cardan speed $v_{Kar,f}$) and cardan setpoint rotational speed $v_{SoKar}$. For this purpose, the cardan speed regulator as a PID regulator is designed with a proportional (P) component, an integral component, and a differential component. These components can be interpreted as follows:

P component:

If the low-pass filtering described above does not take place in block 111, this filtering can be performed as mentioned above in cardan speed regulator 112 according to the equation:

$$v_{Kar/f}(t+i) = v_{Kar/f}(t) + C_{fil} * [v_{Kar}(t) - v_{Kar/f}(t)]$$

where $c_{fil}$ is a filter constant that depends on the above-mentioned condition. The P component of the cardan speed regulator then corresponds to a $PT_1$ component.

The gain $K_p$ is selected in particular as a function of the instantaneously effective total transmission ratio $i_{Ges}$ or $i_{wirk}$ (total transmission ratio between the engine and wheels), to take into account the moment of inertia of the engine with respect to the wheels, which depends on the gear step.

$$Kp = C1 + i^2_{Ges} * C2,$$

where C1 and C2 are constants.

Thus the output of the P component is obtained as:

$$k_{np} = K_p * (v_{Kar/f} - v_{SoKar})$$

D component

Because of the power train oscillations, the differentiator is designed essentially as described in the German Patent Application No. 42 29 560 (corresponding to U.S. Pat. No. 5,443,307):

$$k_{dif} = [i^2_{Ges} * jmot + 2jrad] * [v_{Kar}(t) - v_{Kar}(t-vT)]/(vT),$$

where vT is approximately equal to the period of oscillation of the power train oscillations, $i_{Ges}$ is the instantaneously effective total transmission ratio, and the variables jmot and jrad denote the inertia of the engine and of the wheels, respectively. The D component has a dead zone. Its magnitude $\epsilon_{dif}$ depends on the total transmission ratio $i_{Ges}$:

$$\epsilon_{dif} = \epsilon_{dif/a} + i^2_{Ges} * \epsilon_{dif/b},$$

where $\epsilon_{dif/a}$ and $\epsilon_{dif/b}$ are constants. The dead zone yields the following for the output:

$$k_{nd} = C_d [\min(0, k_{dif} - \epsilon_{dif}) + \max(0, k_{dif} + \epsilon_{dif})].$$

where $c_d$ is a constant.

I component

The integrator gain is normally:

$$K_I = K_{I/a} + i^2_{Ges} * K_{I/a},$$

where $K_{I/a}$ and $K_{I/b}$ are constants.

In three different cases (I, II and III), the integrator gain $K_I$ is corrected:

I. High $\mu$ criterion:

A roadway with a high coefficient of friction is identified when the five different conditions below are met at the same time:

1. $\Lambda_{Rad/l} < \min. (\epsilon_{\lambda 1}, \lambda_{So/l} + \epsilon_{\lambda 2})$
2. $\Lambda_{Rad/r} < \min. (\epsilon_{\lambda 1}, \Lambda_{SO/r} + \epsilon_{\lambda 2})$, where $\epsilon_{\lambda 1}$ and $\epsilon_{\lambda 2}$ are constants
3. $v_F > \epsilon_{vf}$, where $\epsilon_{vf}$ is a presettable threshold value
4. lir is not set, i.e., the higher-level FDR regulator does not provide for any operation.
5. Stability: Both driving wheels must be in a stable slip curve branch for a certain period of time, i.e., relatively little "roughness" is allowed in the curve for the cardan speed $v_{Kar}$. Therefore, the following stability criterion is verified:

The driving wheels are stable when the following relationship holds:

$$\frac{\sum_{v=0}^{k} |v_{Kar,t-v} - v_{Kar,t-v-1}| + \alpha_1}{\sum_{v=0}^{k} |v_{ref,t-v} - v_{ref,t-v-1}| + \alpha_1} < \beta,$$

where the reference cardan speed $v_{ref}$ can be determined from the speeds of the freely rolling driving wheels.

When all five conditions listed above are met over a period of time $t_{mini}$, then $K_I$ is set at a high level:

$$K_I = K_{Ihigh}.$$

II. Increasing the integrator gain

The 1st and 2nd conditions described above are the same as those for the high p criterion. Another condition is:

3. $K_{diff} < \alpha_2 \cdot ktm^* + \beta_2$, where $$ktm^* = (i^2_{Ges} * jmot + 2jrad) * (v_{SoKar,t} - v_{SoKar,t-1})/T$$

If all three conditions mentioned above are met for an interval $t_{mini}$, then $K_I$ is increased to $K_I'$:

$$K_I' = C_{intfakl} + J_I'$$

III. Decreasing the integrator gain

When the following three conditions are met:

1. $k_{ni} < C_{nilow}$ ($k_{ni}$ is the instantaneous integrator value) and
2. $v_{Kar} < v_{SoKar}$ and
3. case II above does not last for more than $t_{mini}$, then the integrator gain $K_I$ is reduced to $K_I'$ according to:

$$K_I' = K_I / c_{intfak2}$$

The new integrator value is:

$$k_{ni,t+1} = k_{ni,t} + K_r * (v_{Kar,t} - v_{SoKar,t}).$$

The integrator value is corrected in the following cases:

I) When the condition $$k_{rom} < \epsilon_{krom}$$

is met, $k_{ni}$ becomes $k_{ni}'$ $$k_{ni}' = k_{ni} + c_{kndif} * [\min(0, x + \epsilon_{kndif}) + \max(0, x - \epsilon_{kndif}).$$

This describes a dead zone where $$x = k_{dif} - ktm^*.$$

II) The integrator value has a lower limit defined by:

$$k_{ni} = \max(k_{ni}, k_{ni,min})$$

III) The integrator has an upper limit defined due to the reduced torque $M_{fa,r}$ requested by the driver:

When $k_{ni} > M_{fa,r}$ is satisfied, two cases are differentiated:
If additionally it holds that:

$$v_{Kar} > v_{SoKar}$$

then $k_{ni} = M_{fa,r} - K_f - k_{13} \text{rom}$ is set, otherwise the old integrator value holds:

$k_{ni,t} = k_{ni,t-1}.$

The output of the cardan speed regulator consists first of the sum of the three regulator components:

$M_{Kar} = k_{np} + k_{nd} + k_{ni}$ and also of the integrator value:

$M_{KarI} := k_{ni}$

PI differential speed regulator (block 113):

The PI differential speed regulator (block 113) determines the differential torque $M_{Dif}$. The more important properties of the differential speed regulator are described below.

Setpoint expansion

When the driving dynamics control flag lir has been set, i.e., the higher-level FDR regulator provides for an FDR operation, the absolute value of the setpoint $v_{SoDif}$ is increased to $v_{SoDif}'$ for the differential speed:

$v_{SoDif}' = (|v_{SoDif}| + \epsilon_{Dif1} * C) * \text{sign}(v_{SoDif}),$ otherwise the setpoint remains unchanged:

$v_{SoDif}' = v_{SoDif}.$

P component

If the low-pass filtering described above does not take place in block 111, this filtering can be performed, as described above, in differential speed regulator 113 according to the following equation:

$v_{Diff}(t+1) = v_{Diff}(t) + B_{fil} * [v_{Dif}(t) - v_{Diff}(t)]$ where $B_{fil}$ is a filter constant that depends on the above condition. The P component then corresponds to a $PT_1$ component.

The filtered control deviation $\Delta_{Dif}$ is then:

$\Delta_{Dif}(t) = v_{Diff}(t) - v_{SoDif}(t).$

The output of the P component is:

$d_{np} = K_{dp} * \Delta_{Dif}(t).$

I component

If lir has been set, i.e., the higher-level FDR regulator provides for an FDR operation, the regulator parameters having the index 1 (i=1) are used; otherwise i=2.
When calculating the integrator value $d_{ni}$, a total of four different cases are differentiated, depending on the control deviation $\Delta_{Dif}$ and $d_{ni}$. If the following condition is met:

$\Delta_{Dif} * d_{ni} < \epsilon_{dni}$ then in the case $|\Delta_{Dif}| > \epsilon_{Dif2}$ the regulator parameter $c_{di1}(i)$ is used:

1) $d_{ni,t+1} = d_{ni,t} - c_{di1}(i) * \text{sign}(d_{ni,t}),$ otherwise $cdi_2(i)$ is used:

2) $d_{ni,t+1} = d_{ni,t} - c_{di2}(i) * \text{sign}(d_{ni,t}),$

If $\Delta_{Dif} * d_{ni} \geq \epsilon_{dni}$ and $|\Delta_{Dif}| > \epsilon_{Dif1}$ are satisfied, then 3) $d_{ni,t+1} = d_{ni,t} + C_{di3}(i) * d_{rom},$ otherwise it holds that 4) $d_{ni,t} += d_{ni,t} - C_{di4}(i) * \text{sign}(d_{ni,t})$ The integrator dynamics are improved in that the integrator value is corrected to the P component in certain cases:

$d_{ni} = \max(|d_{ni}|, c_{di4}(i) * \Delta_{dif} * \text{sign}(\Delta_{Dif})$

Finally, the integrator value has upper and lower limits which are defined by:

$d_{ni} = \min(|d_{ni}|, d_{nimax}) * \text{sign}(d_{ni})$

Regulator output

The regulator output of differential speed regulator 113 consists of the sum of the P component and the I component:

$M_{Dif} = d_{np} + d_{ni},$

Torque distribution to actuators 114:

The distribution of the torques M(including the integrator value $M_{KarI} = k_{ni}$) and $M_{Dif}$ to the actuators takes place in block 114. Differential torque $M_{Dif}$ calculated by differential speed regulator 113 can be applied only through appropriate differences in braking torque between the right and left driving wheels. However, cardan torque $M_{Kar}$ which is calculated by cardan speed regulator 112 and acts on the entire power train is applied by a symmetrical operation affecting the brakes as well as by an operation affecting the engine.

Figure 2:
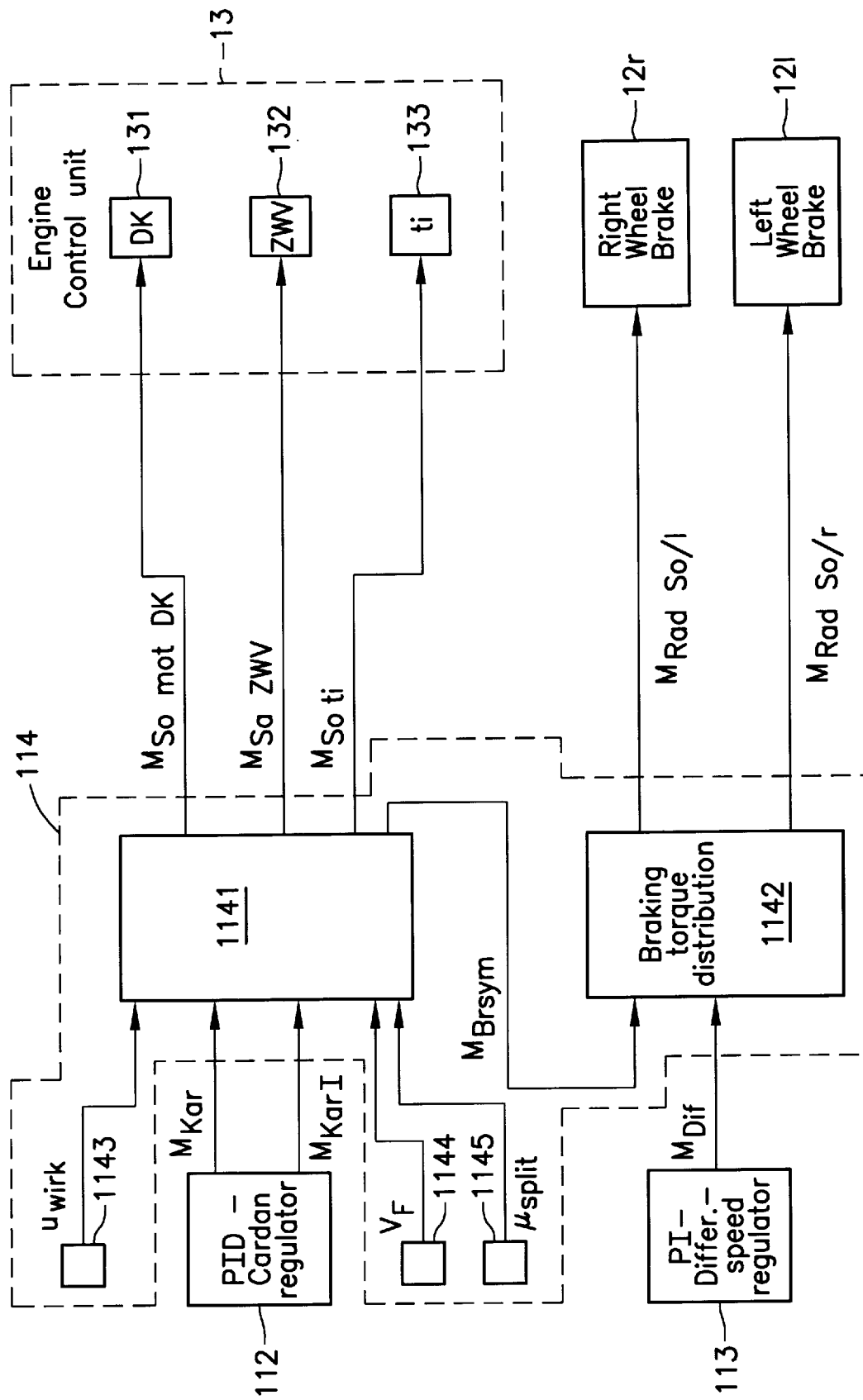
FIG. 2 shows a detailed block diagram of the system illustrated in FIG. 1.

FIG. 2 shows a detailed illustration of torque distribution 114 to the actuators. Cardan torque $M_{Kar}$ calculated by cardan speed regulator 112 and the respective integrator value $M_{KarI}$, as well as the differential torque $M_{Dif}$ calculated by differential speed regulator 113, are sent here to block 114, outlined with a dotted line border. In addition to the setpoint braking torques $M_{RadSoll}$ and $M_{RadSolr}$, the triggering signals $M_{SomotDk}$, $M_{SoZWV}$ and $M_{Soti}$ for the engine actuators, throttle valve Dk 131, firing angle adjustment ZWv 132, and injection reduction ti 133 are available at the output. In addition, to determine the output signals, the effective gear transmission ratio $u_{wirk}$ (block 1143, the gear transmission ratio under some circumstances, taking into account the converter and/or clutch slip), the longitudinal velocity $v_F$ of the vehicle (block 1144) and the information as to whether a $\mu_{split}$ condition is met (block 1145, the driving wheels have significantly different coefficients of friction) are also needed in block 114. The information regarding the effective gear transmission ratio $u_{wirk}$ can originate from a gear control unit, while the information about the longitudinal velocity $v_F$ of the vehicle and whether or not the $\mu_{split}$ condition is met is generally available in the higher-level FDR regulator 10 shown in (FIG. 1).

Figure 3:
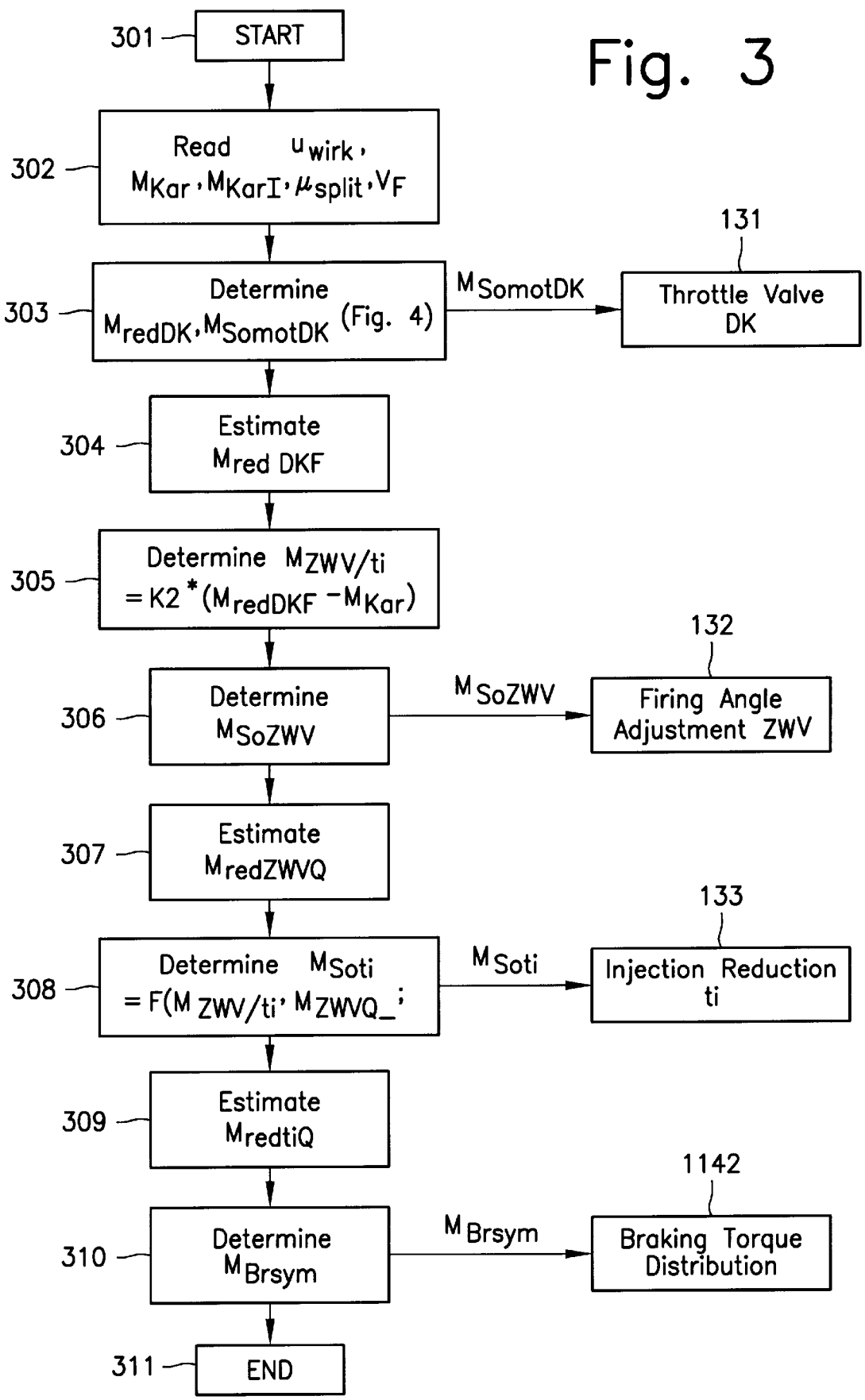
FIG. 3 shows a first flowchart illustrating the method according to the present invention.

The individual steps performed in unit 114 can be seen in the flow chart of FIG. 3. These steps are described in greater detail below.

After starting step 301, the quantities mentioned above are entered in step 302.

Figure 4:
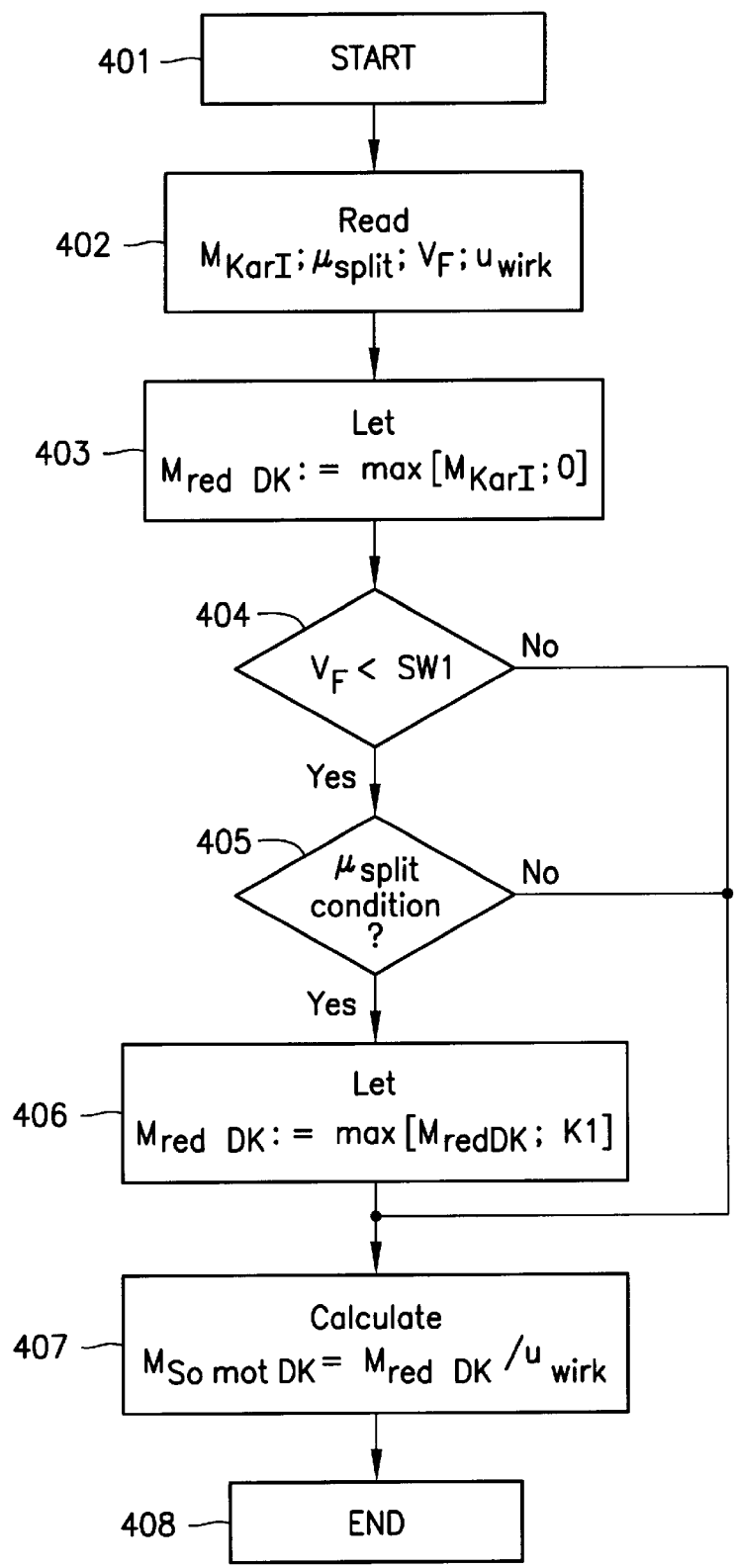
FIG. 4 shows a second flowchart illustrating the method according to the present invention.

Step 303: Determining the setpoint torque for the operation affecting the throttle valve Determination of the setpoint torque for the operation affecting the throttle valve is described with reference to the flow chart shown in FIG. 4.

Let the operations affecting the throttle valve, which acts relatively slowly on the driving torque, set the steady-state end value for the driving torque; therefore, the reduced throttle valve setpoint torque $M_{redk}$ (the setpoint driving torque to be set through the air supply) is at first equal to the integrator value $M_{KarI}$. By setting a lower limit for the reduced throttle valve setpoint torque $M_{redDk}$ (limiting it in the direction of small torques), dragging or braking action of the vehicle engine is ruled out:

$$M_{redDk} := \max[M_{KarI}, 0]$$

After starting step 401 and entering the required information in step 402, the reduced throttle valve setpoint torque $M_{redDk}$ is determined as described above in step 403 in shown FIG. 4.

In starting up a vehicle (longitudinal velocity of the vehicle $v_F$ below a threshold value SW1, query result Y in step 404), it may occur that the driving wheels have very different coefficients of friction (e.g., when the right driving wheel is on loose gravel or ice and the left driving wheel is on a dry roadway). If such a split condition prevails (query result Y in step 405), the reduced throttle valve setpoint torque $M_{rek}$ must not fall below a preset minimum value K1 (step 406) so that the driving torque can be increased again rapidly after correcting for the low wheel (wheel with the lower coefficient of friction). In this case, the engine torque reduction is not applied at all—or is applied only to a slight extent—by the operation affecting the throttle valve which acts more slowly on the driving torque.

Since the reduced throttle valve setpoint torque $M_{redk}$ is based on the wheels, the effective gear transmission ratio must be taken into account in step 407 to determine the throttle valve setpoint torque $M_{SomotDk}$ (triggering signal for engine control unit 13):

$$M_{SomotDk} = M_{redD}k/U_{wirk}$$

Step 304: Estimate of the reduced throttle valve torque $M_{redDk}$

Figure 5:
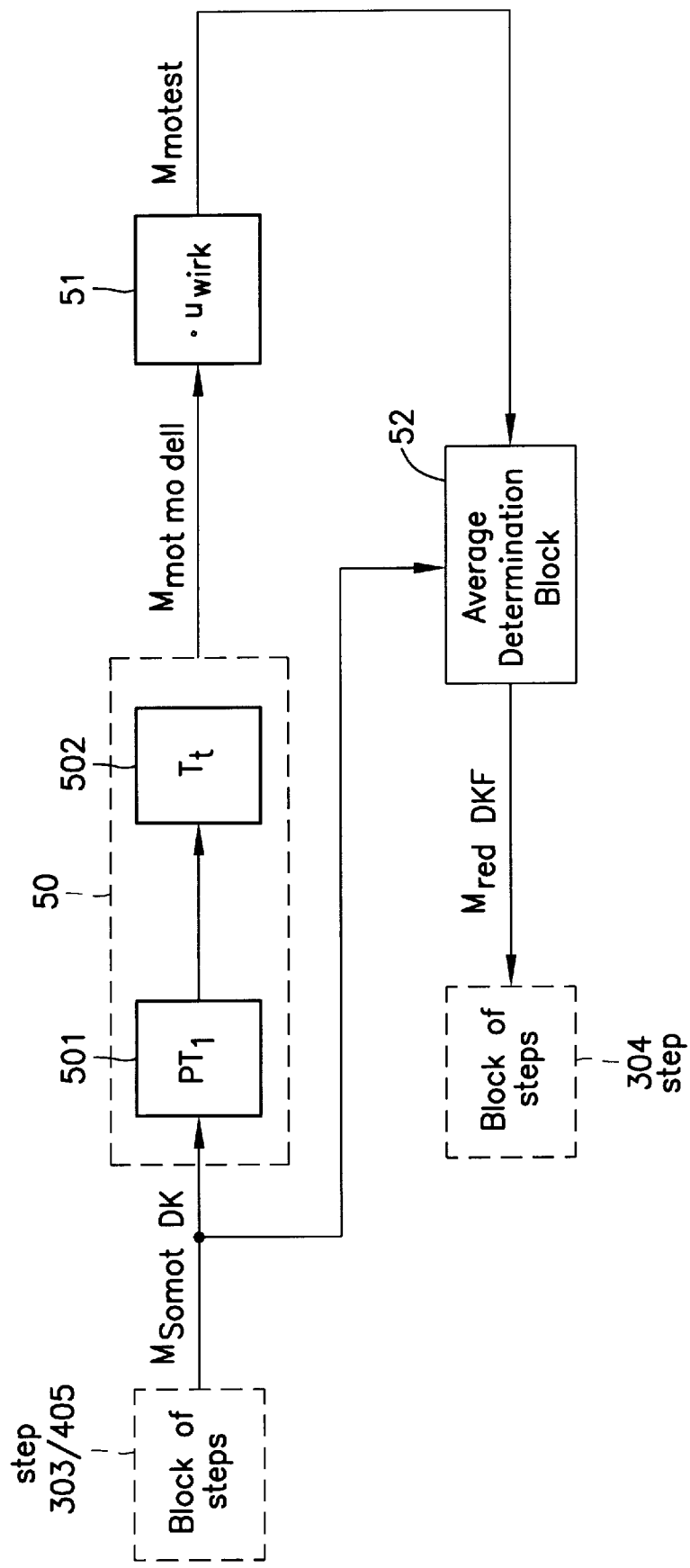
FIG. 5 shows a third flowchart illustrating the method according to the present invention.

To estimate the instantaneously implemented driving torque due to the operation affecting the throttle valve, a signal similarly available can be used directly by engine control unit 13, for which purpose a signal (not shown in FIG. 2) is sent from engine control unit 13 to block 114. If there is no such signal, the estimation method shown in FIG. 5 is used.

To do so, throttle valve torque $M_{SomotDk}$ determined in step 303 or 407 is supplied to an engine model 50. The behavior of the engine can be simulated easily by a known $PT_1$ element 501 and a known lag element $T_t$ 502. Time constant $\tau$ of $PT_1$ element 501 is selected depending on whether the engine torque increases or decreases, and the lag depends on the instantaneous engine rpm. Multiplying in (block 51) the estimate based on the wheels by the effective gear transmission ratio $u_{wirk}$ yields an estimate $M_{motest}$ for the driving torque which results from the operation affecting the throttle valve.

Since phase shifts can occur due to time wasted (computation times and data transmission), for example, the estimate $M_{redKF}$ for the reduced throttle valve torque (based on the driving wheels) is determined as the average of $M_{motest}$ and $M_{redDK}$ (block 52) to correct the phase relation:

$$M_{redDkF} := (M_{motest} + M_{redDk})/2$$

An alternative is filtering:

$$M_{redDkF} := Y*M_{motest} + (1-y)*M_{redDk1}$$

where the value y is between zero and 1 (0<y<1).

Step 305: Determining the setpoint torques for the firing angle adjustment and injection reduction Component K2 (e.g., 90%) of the difference between the estimated throttle valve torque $M_{redkp}$ and the setpoint cardan torque $M_{Kar}$ is to be applied through the firing angle adjustment ZWV and the injection reduction ti. Thus, the engine torque $M_{ZWV/ti}$ to be applied by the firing angle adjustment and injection reduction is thus obtained as:

$$M_{ZWV/ti} := K2*(M_{rekDkF} - M_{Kar})/U_{wirk}$$

Step 306: Determining the firing angle adjustment

Since the firing angle adjustment ZMV acts more rapidly than injection reduction, a firing angle adjustment has a higher priority than injection reduction. Through injection reduction, the component of $M_{ZWV/ti}$, which is determined in step 305 and goes beyond the torque component resulting from the actual firing angle adjustment, is to be applied. The setpoint $M_{SoZWV}$ for the firing angle adjustment is therefore equal to $M_{ZWV/ti}$ taking into account the restriction to be described.

The above-mentioned restriction consists of the fact that the firing angle adjustment to be set may last for only a limited period of time, because otherwise the engine control unit will display an error message because of the monitoring algorithms installed in it.

In the firing angle adjustment, the combustion torque compensates for the dragging torque $M_{Schlepp}$ of the engine without firing and also creates driving torque $M_{motmodell}$ which can be obtained through the engine model described above:

$$M_{motverbrenn} := M_{motmodell} \pm M_{Schlepp};$$

where the operation to be used with a minus sign in front of $M_{Schlepp}$ is subtraction.

Step 307: Estimating the torque produced by the firing angle adjustment

The firing angle adjustment required for setting the setpoint $M_{SoZWV}$ cannot always be set because of restrictions due to the engine control unit. Therefore, in calculating the other actuating torques, setpoint $M_{SoZWV}$ is not taken into account but instead an estimate $M_{ZWVQ}$ is formed for the engine torque actually produced by the firing angle adjustment.

This estimate $M_{ZQVQ}$ may correspond to the torque acknowledged by the engine control unit, for which purpose a signal (not shown in FIG. 2) is sent by engine control unit 13 to block 114. It should be recalled here, however, that such an acknowledgment signal generally has a relatively long delay. For this reason, the torque actually produced by the firing angle adjustment is advantageously estimated.

For this estimate, it is assumed that, in order to set the setpoint $M_{SoZWV}$, the firing angle is always adjusted to the maximum possible value $(M_{motverbrenn} \sim P_{max}/100)$ at the above-mentioned combustion torque $M_{motverbrenn}$. The estimate is thus found to be:

$$M_{ZWVQ} := \min[M_{SoZWV}, (M_{motverbrenn}*P_{max/100})].$$

As an alternative, the estimate may also be obtained as follows:

$$M_{ZWVQ} := \min[M_{SoZWV}, M_{ZWvmax}]$$

where the value $M_{ZWVmax}$ is a selectable parameter.

The driving torque produced by the firing angle adjustment is then:

$$M_{redZWVQ} := U_{Wirk} * M_{ZWWVQ}$$

Step 308: Determining the injection reduction

As described above, the firing angle adjustment ZWV has a higher priority than the injection reduction ti because it takes effect more rapidly. The component of the $M_{ZWV/ti}$ determined in step 305 which goes beyond the torque component $M_{ZWVQ}$ produced by the actual firing angle adjustment is to be applied through injection reduction. The setpoint $M_{Soti}$ which is to be achieved by injection reduction is thus to be determined first by the difference between the torque $M_{ZWV/ti}$ to be applied by firing angle adjustment and injection reduction and the estimate $M_{ZWVQ}$ for the torque actually produced by the firing angle adjustment as follows:

$$M_{Soti} := M_{ZWV/ti} - M_{ZWVQ}$$

However, since injection reduction acts on the driving torque only with a relatively great delay, the variation of the setpoint torque $M_{Soti}$ is calculated in advance (predicted) over a certain period of time (e.g., 120 ms), which corresponds approximately to the delay. This can be accomplished by known methods, for example, by deducing the future characteristic by derivation (differentiation) of the setpoint torque $M_{Soti}$ over time. This yields a predicted setpoint torque $M_{Sotipr}$ for the injection reduction.

If it is found by comparing the predicted setpoint torque $M_{Sotipr}$ with the setpoint torque $M_{Soti}$ to be set that the setpoint torque decreases greatly within the prediction interval, then the injection reduction is restricted or eliminated.

Further restriction in determining the setpoint torque for the injection reduction takes into account start-up processes (longitudinal velocity $v_F$ of the vehicle below a threshold value SW1) at which the driving wheels are on parts of the roadway with different coefficients of friction. If the drive slip of the wheel with the higher coefficient of friction (high wheel) is smaller than a preset slip threshold value $\lambda_s$, this high wheel can develop brake slip when braking due to the injection reduction. This means that the high wheel, which mainly ensures the vehicle acceleration at start-up, can be suddenly braked by injection reduction, which can cause an uncomfortable jerky motion. For this reason, when the conditions $$v_F < SW1$$

and $\lambda_s$ are met, the setpoint torque $M_{Soti}$ for injection reduction or the number of cylinders to be reduced is decreased or equated with zero.

A further restriction in determining the setpoint torque for injection reduction takes into account the fact that the engine is cut off (stalled) at a low rpm by a massive reduction in injection quantity. Thus, for example, at an engine speed below 900 rpm, there is no reduction at all in quantity of injection, whereas only half the engine may be switched off at an engine speed below 1200 rpm due to injection reduction to individual cylinders.

In determining the setpoint torque for the injection reduction, additional restrictions may also be taken into account. Setpoint torque $M_{moti}$ which is to be achieved by injection reduction is then obtained as a function F of the above-mentioned variables:

$$M_{Soti} := F[(M_{redZWV/ti} - M_{ZWVQ}); M_{Sotipr}; \ldots]$$

Step 309: Estimating the torque produced by injection reduction

Since the injection reduction essentially takes place cylinder by cylinder, i.e., it assumes only discrete values of 1 through 6 (in a 6-cylinder engine), the above-mentioned setpoint torque $M_{soti}$ which is to be achieved by reducing the injection cannot normally be set accurately. In determination of an estimate $M_{tiQ}$ for the torque produced by injection reduction, the discretization error occurring due to injection reduction must be taken into account. This is done by inverting the equation for calculating the number of cylinders to be reduced.

The driving torque produced by injection reduction then amounts to:

$$M_{redtiQ} := u_{wirk} + M_{tiQ}$$

This then yields the sum of all driving torques caused by operations rapidly affecting the engine:

$$M_{redZWV/tiF} := M_{redZWVQ} + M_{redtiQ}$$

Step 310: Determining the symmetrical setpoint braking torque

The operations affecting the engine (operations affecting the throttle valve, firing, and injection) are supported by the relatively fast-acting symmetrical operation affecting the brakes, in that the operation affecting the brakes applies the difference between the estimated prevailing engine torque ($M_{redDkF} - M_{ZWV/tiF}$) and the total driving torque $M_{Kar}$ to be set:

$$M_{Brasym} := [M_{redDkF} - M_{redZWV/tiF} - M_{Kar}]/2$$

The result is divided by 2 because the symmetrical braking torque acts on both driving wheels.

The symmetrical braking torque $M_{Brsym}$ can be filtered with a time filter with a preset time constant for reasons of comfort.

A further restriction of the symmetrical braking torque $M_{Brasym}$ to increase comfort involves the fact that the symmetrical braking torque $M_{Brasym}$ is not larger or only insignificantly larger than half of the driving torque applied by the engine.

Braking torque distribution (block 1142, FIG. 2)

The braking torques of the two driving wheels consist of a superpositioning of symmetrical braking torque $M_{Brasym}$ and the differential torque $M_{Dif}$. The plus or minus sign in front of $M_{Dif}$ decides which wheel will have the greater braking torque applied, i.e., which wheel is the p-low wheel.

What is claimed is:

1. A method for setting a driving torque in a motor vehicle, the motor vehicle including at least two triggerable actuators for influencing the driving torque, the method comprising the steps of:

determining a first component of the driving torque for triggering a first actuator of the at least two actuators;

estimating a change in the driving torque as a function of a triggering effect of the first actuator to produce a second component; and triggering at least one second actuator of the at least two actuators as a function of a difference between the driving torque and the second component, the at least one second actuator having a higher dynamic driving torque response than the first actuator.

2. The method according to claim 1, wherein the driving torque is set during an anti-slip regulation.

3. The method according to claim 1, wherein the motor vehicle includes a gasoline engine, wherein the first actuator modifies an air supply, and wherein the at least one second actuator modifies at least one of a firing point, a fuel quantity and a braking force on driven wheels.

4. The method according to claim 3, wherein the air supply is modified by changing a throttle valve setting.

5. The method according to claim 1, wherein the change in the driving torque is estimated as a function of an engine model, and further comprising the step of:

triggering of the first actuator using a control signal, the control signal being filtered using at least one of a time filter and a lag element to estimate the change in the driving torque.

6. The method according to claim 1, wherein the first component's sets a positive torque.

7. The method according to claim 6, wherein the positive torque is indicative of a zero value dragging torque.

8. The method according to claim 1, wherein the first component is determined for limiting the driving torque to a minimum positive value, the driving torque being limited to the minimum positive value when at least one of the following conditions is met:

a longitudinal velocity of the motor vehicle is low, and coefficients of predetermined values of friction are present on two sides of the motor vehicle.

9. The method according to claim 3, wherein the at least one second actuator modifies the fuel quantity by reducing a fuel metering to individual cylinders of a vehicle engine of the motor vehicle, a triggering action of the at least one second actuator being predicted over a predetermined time period to provide at least one predicted triggering value, the triggering action being suppressed when the at least one predicted triggering value is below a predetermined threshold value.

10. The method according to claim 3, wherein the at least one second actuator modifies the fuel quantity by reducing a fuel metering to individual cylinders of a vehicle engine of the motor vehicle, a triggering action of the at least one second actuator being one of reduced and suppressed when a drive slip of a driving wheel is below a predetermined threshold value, the driving wheel having a higher coefficient of friction that is higher than a coefficient of friction of at least another wheel of the motor vehicle.

11. A device for setting a driving torque in a motor vehicle, comprising:

at least two triggerable actuators for influencing the driving torque and including a first actuator and at least one second actuator, the at least one second actuator having a higher dynamic driving torque response than the first actuator; and a regulator for performing the following functions:

determining a first component of the driving torque for triggering the first actuator, estimating a change in the driving torque as a function of a triggering effect of the first actuator to produce a second component, determining a difference between the driving torque and the second component, and triggering the at least one second actuator as a function of the difference.

\* \* \* \* \*

UNITED STATES PATENT AND TRADEMARK OFFICE
CERTIFICATE OF CORRECTION

PATENT NO.     : 6,182,003 B1
DATED          : January 30, 2001
INVENTOR(S)    : Rolf Maier-Landgrebe It is certified that error appears in the above-identified patent and that said Letters Patent is hereby corrected as shown below:

Column 1,
Line 39, change "effects to differ" to -- effects are known to differ --.
Line 46, before "invention" insert -- present invention --.

Column 2,
Line 6, delete "as" and in its place insert -- the method according to the present --.

Column 3,
Line 26, change "is." to -- is described as embedded in an overall system --.
Line 61, change "speeds, determined" to -- speeds determinination --.

Column 4,
Line 30, change "**" to -- * --.

Column 5,
Line 4, change "integral" to -- integral (I) --.
Line 5, change "differential" to -- differential (D) --.
Line 12, change "i" to -- 1 --.

Column 6,
Line 21, change "p" to -- $\mu$ --.

Column 7,
Line 1, change "$K_{13}$rom" to -- K__rom --.

Column 8,
Line 64, change "shown in (FIG. 1)." to -- (shown in FIG. 1). --

Column 10,
Line 9, change "y" to -- $\gamma$ --.

Column 11,
Line 35, change "found" to -- determined --.
Line 55, change "and $\lambda$" to -- and <$\lambda_5$ --.

UNITED STATES PATENT AND TRADEMARK OFFICE
CERTIFICATE OF CORRECTION

PATENT NO. : 6,182,003 B1
DATED : January 30, 2001
INVENTOR(S) : Rolf Maier-Landgrebe It is certified that error appears in the above-identified patent and that said Letters Patent is hereby corrected as shown below:

Column 12,
Line 45, change "Brasym" to -- Brysm --.
Line 46, change "Brasym" to -- Brysm --.
Line 47, change "Brasym" to -- Brysm --.
Line 52, change "Brasym" to -- Brysm --.

Column 13,
Line 21, change "component's" to -- component --.

Column 14,
Line 13, delete "higher".

Signed and Sealed this

Eighteenth Day of June, 2002

Attest:

Attesting Officer

JAMES E. ROGAN
Director of the United States Patent and Trademark Office